United States Patent
Klappert et al.

(10) Patent No.: US 9,116,645 B1
(45) Date of Patent: Aug. 25, 2015

(54) METHODS AND SYSTEMS FOR GRANTING PARTIAL OR FULL ACCESS TO AN APPLICATION BASED ON LEVEL OF CONFIDENCE THAT PRINT CORRESPONDS TO USER PROFILE

(71) Applicant: United Video Properties, Inc., Santa Clara, CA (US)

(72) Inventors: Walter R. Klappert, Los Angeles, CA (US); Minah Oh, Los Angeles, CA (US); Michael R. Nichols, La Canada Flintridge, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 14/525,981

(22) Filed: Oct. 28, 2014

(51) Int. Cl.
*G06F 15/00* (2006.01)
*G06F 3/12* (2006.01)

(52) U.S. Cl.
CPC ............ *G06F 3/1222* (2013.01); *G06F 3/1238* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,400,836 B2 | 6/2002 | Senior | |
| 6,564,378 B1 | 5/2003 | Satterfield et al. | |
| 6,756,997 B1 | 6/2004 | Ward, III et al. | |
| 6,941,001 B1 | 9/2005 | Bolle et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2006/0104224 A1* | 5/2006 | Singh et al. | 370/310 |
| 2007/0025600 A1* | 2/2007 | Ghebreyesus | 382/124 |
| 2007/0103712 A1* | 5/2007 | Corona | 358/1.14 |
| 2009/0320106 A1* | 12/2009 | Jones et al. | 726/5 |
| 2010/0153885 A1 | 6/2010 | Yates | |
| 2013/0321337 A1 | 12/2013 | Graham et al. | |

OTHER PUBLICATIONS

Racoma, "Samsung Patent Suggests Multi-Fingerprint E-Wallet Authentication and Gesture Control," Apr. 22, 2014, accessed from the internet at http://www.androidauthority.com/samsung-patent-suggests-multi-fingerprint-e-wallet-authentication-gesture-control-371820/.

* cited by examiner

*Primary Examiner* — Marcus T Riley
(74) *Attorney, Agent, or Firm* — Ropes & Gray LLP

(57) ABSTRACT

Systems and methods are provided herein for determining whether full or partial access to an application should be granted based on whether a full print or a partial print is detected. The control circuitry may then identify a user profile corresponding to a print. Control circuitry may determine a level of confidence that the print corresponds to the user profile. Control circuitry may determine whether to provide the user full access to the application by comparing the level of confidence to a threshold, where, if the level of confidence exceeds the threshold, the user is granted full access to the application. In the case that the level of confidence does not exceed the threshold, the control circuitry may compare the level of confidence to a different threshold, where, if the different threshold is exceeded, the user may be granted partial access to the application.

20 Claims, 5 Drawing Sheets

METHODS AND SYSTEMS FOR GRANTING PARTIAL OR FULL ACCESS TO AN APPLICATION BASED ON LEVEL OF CONFIDENCE THAT PRINT CORRESPONDS TO USER PROFILE

BACKGROUND

Fingerprint scanners have recently been integrated in many devices, such as laptops, smartphones, vaults, and the like. Traditionally, fingerprint scanners are used as a security measure to ensure access is only granted to authorized individuals. As fingerprint scanners become more ubiquitous there exists a growing opportunity to expand the functionality of fingerprint scanners to perform functions beyond plain authentication.

SUMMARY

Accordingly, systems and methods are described herein for expanding the functionality of a print scanner. As an example, a fingerprint scanner might be used not only for authentication purposes, but also to invoke functionality. The scanner may be programmed to invoke additional functions depending on whether only a portion of a finger is detected by a scanner rather than a full finger. As an example, the scanner may enable quick access to a user's private information if a full fingerprint is detected by the scanner, but may enable quick access only to applications that do not require a user's private information if a partial fingerprint is detected. In this manner, it would be possible for a user to share a user equipment device such as a smartphone with a friend. An example of the sharing process is as follows: a user may have cookies, private passwords, and other login information saved on a browser on the user's smartphone. The user may wish to share his or her smartphone, and may activate access to the browser that does not include any of the cookies, private passwords, or other login information during a session by using just the tip of the user's finger on a fingerprint scanner, as opposed to the user's full fingerprint. When the user wishes to again have his or her personal information accessible in the browser, the user may activate the browser using the user's full fingerprint.

In some aspects, control circuitry may detect a presence of a print associated with a user body part. For example, a user may place a finger on a print reader, and control circuitry may detect a fingerprint. The control circuitry may then identify a user profile corresponding to the print. As an example, the control circuitry may access a database to determine whether a matching fingerprint is stored in the database records, and may determine therefrom to whom the fingerprint belongs. Once the control circuitry identifies the person, a user profile corresponding to the person may be identified as well.

The control circuitry may also determine a surface area of the print. For example, when the control circuitry detects the presence of the print, the control circuitry may cause the print reader to not only scan the print for the purposes of identifying a corresponding user, but also to scan the surface area of the print for the purpose of invoking a function. The control circuitry may, based on both the identified profile and the surface area of the print, determine whether the detected print represents a partial print or a full print. As an example, if a child is using the print reader and the control circuitry determines the surface area of the child's fingerprint is 0.5 centimeters, the control circuitry may determine that the detected print represents a full print, whereas if an adult is using the print reader, a 0.5 surface area centimeter may be determined to be a partial print. This is because an adult has a larger finger size than a child. Based on whether the control circuitry determines that a full print or a partial print is detected, the control circuitry may invoke a respective function. For example, if control circuitry detects that the print reader is used when a volume control application is being utilized, the control circuitry may cause volume to raise or lower by a smaller increment than an increment that would be used if a full print is detected.

In some embodiments, control circuitry determines whether the detected print represents a partial print or full print by comparing the surface area of the print to an entry in the user profile. As an example, control circuitry may utilize an "age" or "height" entry to estimate the size of a user's full fingerprint, which may be utilized to determine whether the detected surface area corresponds to a full or partial print. As another example, control circuitry may prompt a user to place just the tip of the user's finger on the print reader to initialize a "partial print size" entry in the user's profile, and may be prompt the user to place the user's full fingerprint on the print reader to initialize a "full print size" entry in the user's profile. In this example, control circuitry may compare the surface area to the partial print and full print size entries to determine which size is nearer to the detected surface area.

In some embodiments, control circuitry may cause a threshold surface area that corresponds to the surface area of a user's full print to be stored (e.g., in an entry of a user profile). In these instances, control circuitry may retrieve the threshold surface area from the entry, and may compare the detected surface area to the threshold to determine whether a partial or full print is detected by the print reader.

In some embodiments, when control circuitry detects a full print, control circuitry may invoke a function that is related to a function that would be invoked if control circuitry detected a partial print. For example, when control circuitry detects a partial print in connection with a channel-change command, a next channel in a sequence may be tuned to. On the other hand, when control circuitry detects a full print in connection with a channel-change command, a favorite channel associated with the user profile may be tuned to.

In some embodiments, when control circuitry detects a partial print, control circuitry may invoke a function of performing a media guidance operation of a first magnitude. Similarly, when control circuitry detects a full print, control circuitry may invoke a function of performing the same media guidance operation, except with a second, greater magnitude as compared to the first magnitude. For example, if the media guidance operation is volume control, when control circuitry detects a partial print the control circuitry may cause the volume to raise by one increment, whereas when control circuitry detects a full print, the control circuitry may cause the volume to raise by two or more increments.

In some embodiments, when control circuitry detects partial or full prints, control circuitry may invoke functions that are related to generating for display media asset identifiers. For example, control circuitry may generate an uncustomized page of media asset identifiers when control circuitry detects a partial print, whereas control circuitry may generate for display a customized page of media asset identifiers when control circuitry detects a full print. In this manner, control circuitry enables a user to view an unedited page of media asset identifiers if, for example, control circuitry determines that the user has become bored with the user's usual favorite media assets.

In some embodiments, when control circuitry identifies the user profile to which the print corresponds, control circuitry may query a database. While querying the database, control circuitry may cross-reference characteristics of the detected print against entries in a database to identify an entry that corresponds to the characteristics of the print. While cross-referencing the characteristics, control circuitry may analyze features of the print (e.g., whorls, etc.) and utilize the features as a means of uniquely identifying the person to whom the print corresponds.

In some embodiments, control circuitry may detect the presence of the print at a mobile device, and may invoke the first function and second function at a device different from the mobile device. For example, control circuitry may detect the presence of the print at a smartphone, such as one's iPhone, and may cause corresponding functions (e.g., the volume control functions discussed above) to be performed on a television device. In other embodiments, control circuitry may detect the presence of the print at a same device as the device on which the functions are performed.

Systems and methods are also provided herein for determining whether full or partial access to an application should be granted based on whether a full print or a partial print is detected. In some aspects, control circuitry may detect a presence of a print associated with a user body part. For example, a user may place a finger on a print reader, and control circuitry may detect the presence of a fingerprint corresponding to the finger. The control circuitry may then identify a user profile corresponding to the print. As an example, the control circuitry may access a database to determine whether a matching fingerprint is stored in the database records, and may determine therefrom to whom the fingerprint belongs. Once control circuitry identifies the person, control circuitry may identify a user profile corresponding to the person.

In some embodiments, control circuitry may determine a level of confidence that the print corresponds to the user profile. For example, control circuitry may determine that a detected print yields an imperfect match (e.g., only seventy percent of a print's characteristics match those of a corresponding database entry). A level of confidence may correspond to a number, percentage, or ratio of corresponding features of a print to features of a user profile. Control circuitry may determine whether to provide the user full access to the print by comparing the level of confidence to a threshold, where, if the level of confidence exceeds the threshold, the user is granted full access to the application. In the case that the level of confidence does not exceed the threshold, the control circuitry may compare the level of confidence to a different threshold, where, if the different threshold is exceeded, the user may be granted partial access to the application. As an example, the level of confidence may be diminished if a user utilizes just the tip of the user's finger to interact with a print reader, rather than the user's entire finger. In the instance where just the tip of the user's finger is detected by the print reader, the control circuitry of the print reader may be able to identify fewer characteristics of the user's fingerprint than it would have been able to identify if the user's full fingerprint were detected. In this case, control circuitry may determine that a first threshold level of confidence is not met, but a second threshold level of confidence may be met. If control circuitry determines that the second threshold level of confidence is met, control circuitry may enable the user to access a subset of features offered by the application.

In some embodiments, if the user is granted full access to the application, control circuitry may enable the user to access features of the application that utilize information from the user profile. In some embodiments, if the user is granted partial access to the application, control circuitry may enable the user to access features of the application that do not utilize information from the user profile. For example, if the application is a media guidance application, control circuitry may grant access to a user with full access to the application to a customized display of media asset identifiers associated with the user profile. Following this example, control circuitry may, for a user with partial access to the application, generate for display an uncustomized display of media asset identifiers.

In some embodiments, the print may correspond to a finger, and control circuitry may determine the level of confidence based on whether the print is of a particular portion of the finger. For example, control circuitry may initialize a profile by prompting a user to provide different sample prints for the user's full fingerprint as well as just the tip of the user's fingerprint. Control circuitry may determine the level of confidence to be sufficiently higher than the second threshold if control circuitry can identify the print as corresponding to just the tip of the user's fingerprint.

In some embodiments, control circuitry detects a gesture performed by a finger, and invokes a function based on the gesture. As an example, if the finger is swiped to the right, a media guidance application may be activated or opened. Gestures may be set by a user and associated with a user profile, or may be general gestures pre-programmed into the control circuitry.

In some embodiments, control circuitry may set each threshold based on characteristics of the user profile. For example, a user may command control circuitry to set a high threshold for allowing access to the full application if the full application includes sensitive, private, or personal information. If partial access involves non-personal, non-sensitive, and non-private information, a user may set the second threshold to be a low threshold.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DESCRIPTION

Figure 1:
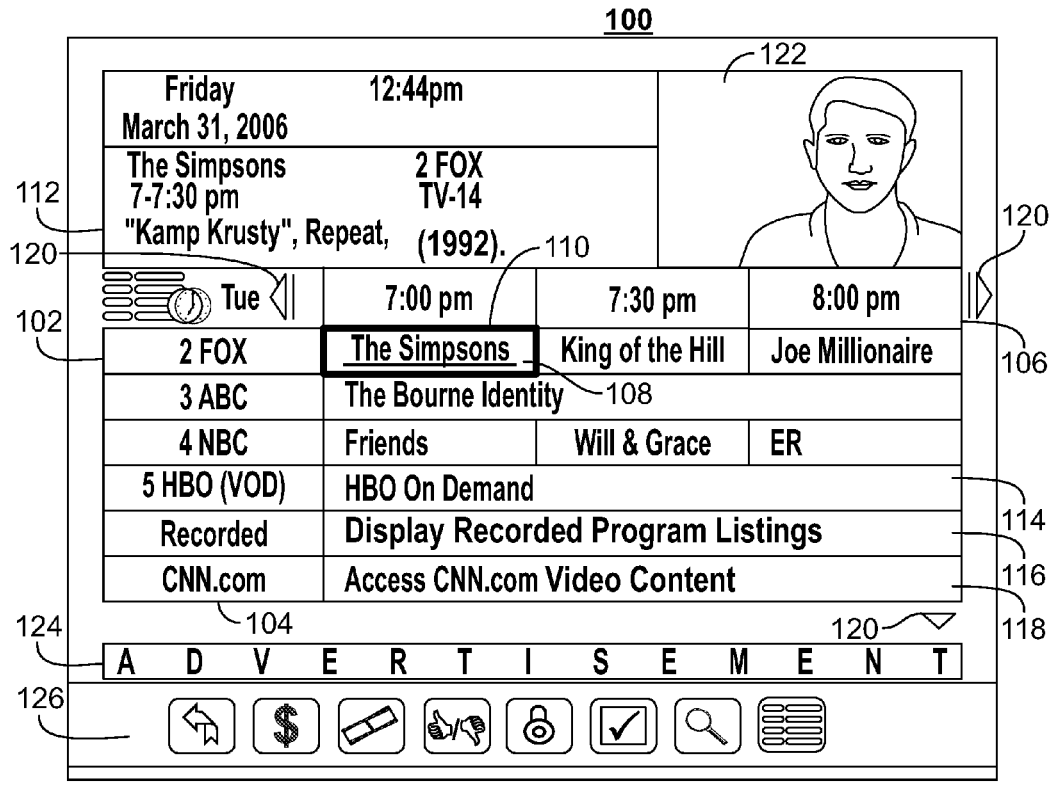
FIG. 1 shows an illustrative embodiment of a display screen that may be used to provide media guidance application listings and other media guidance information, in accordance with some embodiments of the disclosure.

Systems and methods are provided herein for invoking a function based on whether a full or partial print is detected. In some embodiments, control circuitry may detect a presence of a print associated with a user body part. For example, a user may place a finger on a print reader, and control circuitry may detect a fingerprint. The control circuitry print reader may then identify a user profile corresponding to the print. As an example, the control circuitry may access a database to determine whether a matching fingerprint is stored in the database records, and may determine therefrom to whom the fingerprint belongs. Once the control circuitry identifies the person, a user profile corresponding to the person may be identified as well.

The control circuitry may also determine a surface area of the print. For example, when the control circuitry detects the presence of the print, the control circuitry may cause the print reader to not only scan the print for the purposes of identifying a corresponding user, but also to scan the surface area of the print for the purpose of invoking a function. The control circuitry may, based on both the identified profile and the surface area of the print, determine whether the detected print represents a partial print or a full print. As an example, if a child is using the print reader and the control circuitry determines the surface area of the child's fingerprint is 0.5 centimeters, the control circuitry may determine that the detected print represents a full print, whereas if an adult is using the print reader, a 0.5 centimeter surface area may be determined to be a partial print. This is because an adult has a larger finger size than a child. Based on whether the control circuitry determines that a full print or a partial print is detected, the control circuitry may invoke a respective function. For example, if control circuitry detects that the print reader is used when a volume control application is being utilized, the control circuitry may cause volume to raise or lower by a smaller increment than an increment that would be used if a full print is detected.

Systems and methods are also provided herein for determining whether full or partial access to an application should be granted based on whether a full print or a partial print is detected. In some aspects, control circuitry may detect a presence of a print associated with a user body part. For example, a user may place a finger on a print reader, and control circuitry may detect the presence of a fingerprint corresponding to the finger. The control circuitry may then identify a user profile corresponding to the print. As an example, the control circuitry may access a database to determine whether a matching fingerprint is stored in the database records, and may determine therefrom to whom the fingerprint belongs. Once control circuitry identifies the person, control circuitry may identify a user profile corresponding to the person.

In some embodiments, control circuitry may determine a level of confidence that the print corresponds to the user profile. For example, control circuitry may determine that a detected print yields an imperfect match (e.g., only seventy percent of a print's characteristics match those of a corresponding database entry). A level of confidence may correspond to a number, percentage, or ratio of corresponding features of a print to features of a user profile. Control circuitry associated may determine whether to provide the user full access to the print by comparing the level of confidence to a threshold, where, if the level of confidence exceeds the threshold, the user is granted full access to the application. In the case that the level of confidence does not exceed the threshold, the control circuitry may compare the level of confidence to a different threshold, where, if the different threshold is exceeded, the user may be granted partial access to the application. As an example, the level of confidence may be diminished if a user utilizes just the tip of the user's finger to interact with a print reader, rather than the user's entire finger. In the instance where just the tip of the user's finger is detected by the print reader, the control circuitry of the print reader may be able to identify fewer characteristics of the user's fingerprint than it would have been able to identify if the user's full fingerprint were detected. In this case, control circuitry may determine that a first threshold level of confidence is not met, but a second threshold level of confidence may be met. If control circuitry determines that the second threshold level of confidence is met, control circuitry may enable the user to access a subset of features offered by the application.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device,"

"user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
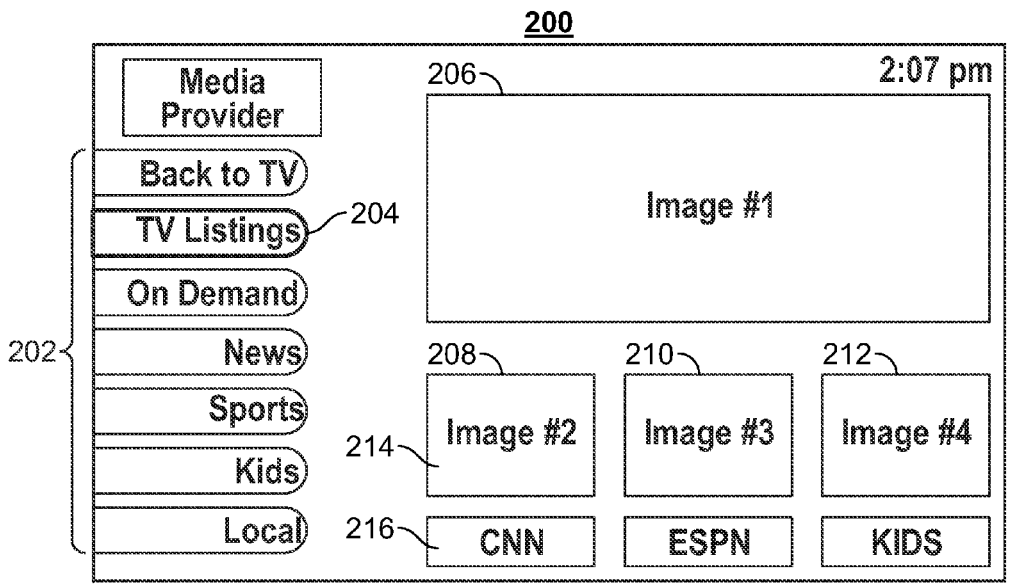
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
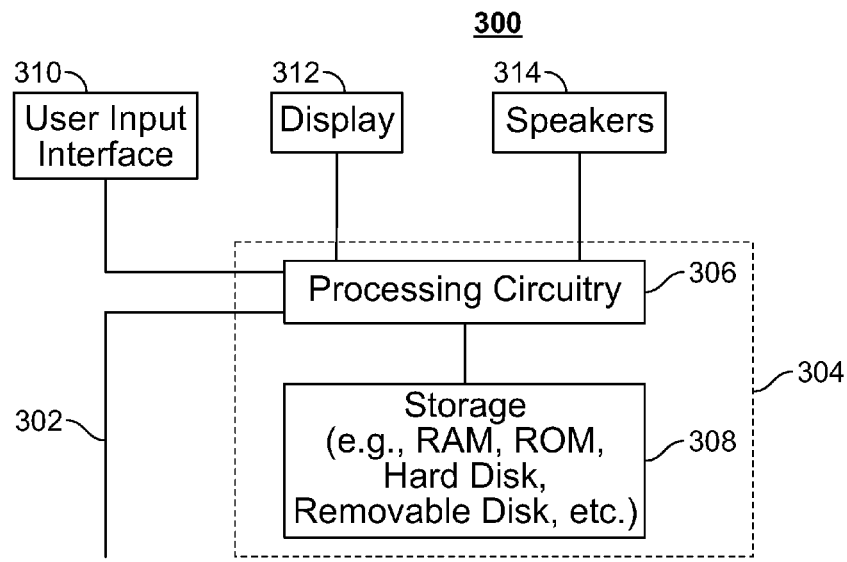
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, print reader/scanner (e.g., fingerprint reader), or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
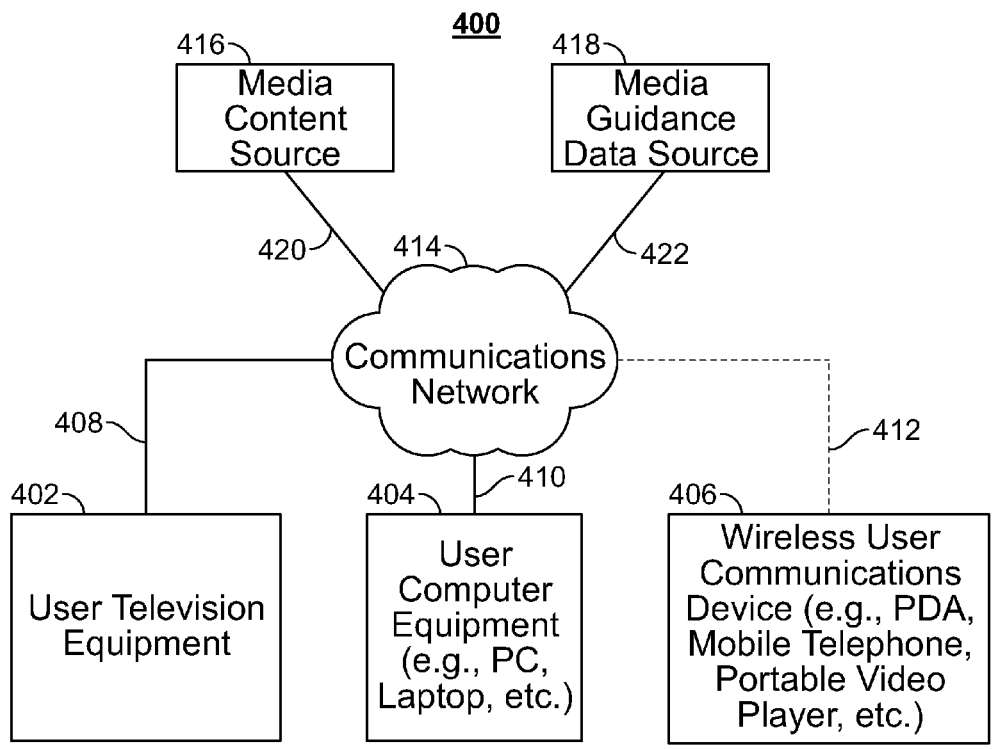
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/ or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

The term "print" as used herein is defined to mean any visible or tactile characteristic of a body part of a person, animal, or other life form. Body parts of people, such as fingers, generally have unique characteristics such as fingerprint features (e.g., whorls, arches, etc.) that may be utilized to identify a person; however, other characteristics may form portions of a print. For example, birthmarks, skin pigmentation, and any other marking, indentation, or protrusion on a body part of a person may form a portion of a print. Similarly, animals and other life forms have distinguishing characteristics on body parts (e.g., unique features on a dog's paw) that are contemplated by the term "print."

In some embodiments, control circuitry (e.g., control circuitry 304) may determine whether to invoke a first or second function in response to detecting a presence of a print. For example, if control circuitry detects a presence of a fingerprint, control circuitry may analyze the fingerprint to determine whether the fingerprint represents a partial print (e.g., just the tip of the fingerprint) or a full print (e.g., the entire fingerprint). When control circuitry detects a partial print, a first function may be invoked (e.g., an increment in volume of one unit), and when control circuitry detects a full print, a second function may be invoked (e.g., an increment in volume of two or more units).

Figure 5:
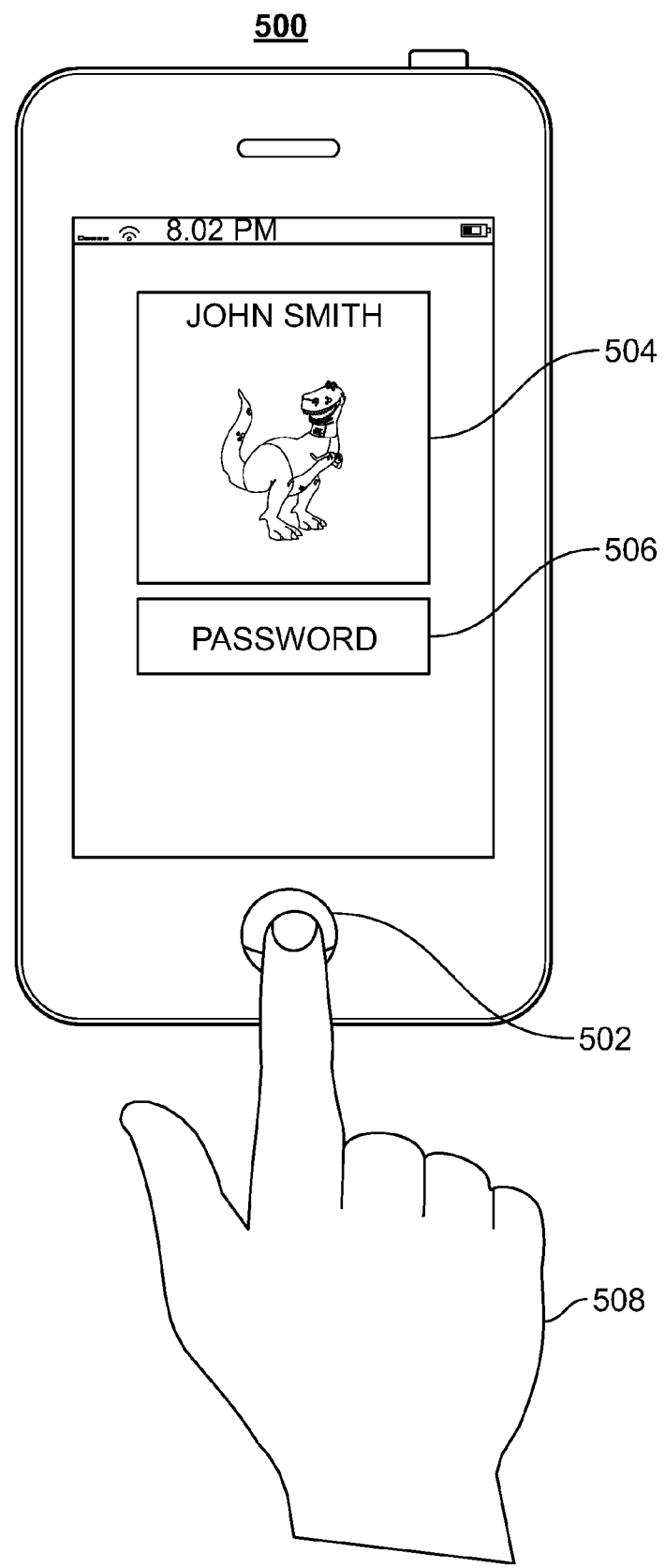
FIG. 5 shows an illustrative embodiment of a user equipment device including a print reader, in accordance with some embodiments of the disclosure.

FIG. 5 shows an illustrative embodiment of a user equipment device including a print reader, in accordance with some embodiments of the disclosure. User equipment 500 is depicted as a mobile device, but may be any user equipment device, including user television equipment 402, user computer equipment 404, or wireless user communications device 406. While user equipment 500 is depicted to include print reader 502, print reader 502 may be part of a different user equipment device from user equipment 500, or may be implemented as a stand-alone print reader device. Control circuitry 304 may unlock user equipment 500 for the purpose of accessing one or more applications if control circuitry 304 detects the input of a password (e.g., via password input 506) or if control circuitry 304 detects the presence of a print (e.g., from some or all of body part 508). An application may be associated with a particular user (e.g., may include information of a particular user), and control circuitry 304 may generate for display an indication of the particular user (e.g., as shown in 504).

In some embodiments, control circuitry 304 may detect a presence of a print associated with a user body part. Control circuitry 304 may detect the presence of the print when a user interacts with print reading functionality of user input interface 310. For example, control circuitry 304 may detect a presence of a print when a user presses a finger (e.g., body part 508) against print reader 502 (which may be integrated as print reading functionality of user input interface 310). When a presence of a print is detected, control circuitry 304 may determine or identify characteristics of body part 508. For example, if body part 508 is a finger, control circuitry 304 may identify fingerprint features such as whorls or arches. Control circuitry 304 may identify any characteristic of body part 508, including skin patterns, skin marks (e.g., birth marks, freckles, and the like), skin pigment, hair density, hair color, and any other characteristic. If body part 508 belongs to a non-human entity, non-human characteristics may be considered as well, such as paw prints, fur color, fur density, fur type, and the like.

In some embodiments, control circuitry 304 may identify a user profile corresponding to the detected print. Control circuitry 304 may query a database, such as media guidance data source 418 or media content source 416, in order to identify the user profile. The database may be local to control circuitry 304 (e.g., at storage 306) or remote to control circuitry 304 (e.g., accessible via communications network 414). Control circuitry 304 may query the database for an entry corresponding to detected characteristics of user body part 508. Control circuitry 304 may determine that an entry corresponds to the detected characteristics of user body part 508 by cross-referencing the detected characteristics against entries of media guidance data source 418. If more than one entry corresponds to the detected characteristics of user body part 508, control circuitry 304 may identify a user profile based on determining an entry that best matches the determined characteristics (i.e., an entry that reflects the most characteristics in common with user body part 508).

In some embodiments, control circuitry 304 may determine a surface area of the print. Control circuitry 304 may determine an absolute surface area of the print based on a measured size of the print, or may determine a relative surface area of the print (e.g., how much surface area of print reader 502 is covered relative to its full size).

Control circuitry 304 may determine whether the detected print represents a partial print or a full print based on both the identified profile and the surface area of the print. For example, control circuitry 304 may first determine the size of a user's full fingerprint based on the user profile. Control circuitry 304 may determine the size of the user's full fingerprint by accessing media guidance data source 418 (e.g., via communications network 414) to determine whether a fingerprint size is associated with the user profile. If there is no full fingerprint size associated with the user profile, control circuitry 304 may approximate the size of the user's fingerprint based on other user profile information (e.g., age, gender, height). As an example, the full fingerprint size of a child may be approximated to be small, whereas the full fingerprint size of an adult may be approximated to be large.

Upon determining the full fingerprint size, control circuitry 304 may compare the full fingerprint size to the determined surface area. Control circuitry 304 may determine that the detected print represents a full print if the surface area is equal to or substantially equal to the full fingerprint size. Control circuitry 304 may determine that the surface area is substantially equal to the full fingerprint size if the surface area is within a predetermined range or percentage of the full fingerprint size, or if the surface area is above a threshold full fingerprint size or percentage. For example, if the surface area is determined to be 90% or more of the full fingerprint size, control circuitry 304 may determine that the surface area is substantially equal to the full fingerprint size. If control circuitry 304 determines that the surface area is not equal to or substantially equal to the full fingerprint size, control circuitry 304 may determine that the detected print represents a partial print.

Control circuitry 304 may invoke a first function in response to determining that the detected print represents a partial print, and may invoke a second function in response to determining that the detected print represents a full print. The first function and the second function may be related or unrelated functions. The first function and/or the second function, when invoked, may trigger a command related to at least one of volume control, channel tuning, media playback, and media selection at user equipment 500 or a different user equipment device. Additionally the first and/or second functions may relate to any function including the opening or exiting of an application, accessing a predetermined application, triggering a telephone conversation or the establishment of a chat link (e.g., via Internet Protocol, SMS, and the like).

The first and second functions may be related functions. As an example, control circuitry 304 may perform functions (e.g., media guidance functions such as volume or channel control) of different magnitude depending on whether the first or second function is invoked, where, when a partial print is detected, a first function is of a smaller magnitude than a second function associated with a full print would be if a full print were detected. Accordingly, if the first and second functions are volume control commands, control circuitry 304 may increase or decrease the volume at a smaller magnitude if the first function is invoked, rather than the second function, and vice versa.

In some embodiments, control circuitry 304 may determine the magnitude to be invoked for each of the first and second functions based on the user profile. Control circuitry 304 may determine user preferences from the user profile based on monitored user statistics (e.g., previous user activity) or based on explicitly entered user preferences (e.g., user affirmatively specifies a magnitude to be associated with each of the first and second function).

In some embodiments, control circuitry 304 may generate for display media asset identifiers when the first and/or second functions are invoked. In some embodiments, when a partial print is detected and control circuitry 304 is to invoke the first function, control circuitry 304 may generate for display (e.g., via display 312) an uncustomized page of media asset identifiers. Similarly, when a full print is detected and control circuitry 304 is to invoke the second function, control circuitry 304 may generate for display (e.g., via display 312) a customized page of media asset identifiers.

In some embodiments, control circuitry 304 may detect a presence of a print associated with a user body part (e.g., a fingerprint detected via user input interface 310) and identify a user profile corresponding to the detected print. Control circuitry 304 may determine a level of confidence that the print corresponds to the user profile (e.g, by consulting media guidance data source 418) and determine whether to provide the user full or partial access to an application based on the level of confidence. As an example, control circuitry 304 may provide partial access to an application by restricting any dissemination of personal information of a user that would otherwise be disseminated if full access were granted to an application.

In some embodiments, control circuitry 304 may detect a presence of a print associated with a user body part. Control circuitry 304 may detect the presence of the print when a user interacts with print reading functionality of user input interface 310. For example, control circuitry 304 may detect a presence of a print when a user presses a finger (e.g., body part 508) against print reader 502. When a presence of a print is detected, control circuitry 304 may determine or identify characteristics of body part 508. For example, if body part 508 is a finger, control circuitry 304 may identify fingerprint features such as whorls or arches. Control circuitry 304 may identify any characteristic of body part 508, including skin patterns, skin marks (e.g., birth marks, freckles, and the like), skin pigment, hair density, hair color, and any other characteristic. If body part 508 belongs to a non-human entity, non-human characteristics may be considered as well, such as paw prints, fur color, fur density, fur type, and the like.

In some embodiments, control circuitry 304 may identify a user profile corresponding to the detected print. Control circuitry 304 may query a database, such as media guidance data source 418 or media content source 416, in order to identify the user profile. The database may be local to control circuitry 304 (e.g., at storage 306) or remote to control circuitry 304 (e.g., accessible via communications network 414). Control circuitry 304 may query the database for an entry corresponding to detected characteristics of user body part 508. Control circuitry 304 may determine an entry corresponds to the detected characteristics of user body part 508 by cross-referencing the detected characteristics against entries of media guidance data source 418. If more than one entry corresponds to the detected characteristics of user body part 508, control circuitry 304 may identify a user profile based on determining an entry that best matches the determined characteristics (i.e., an entry that reflects the most characteristics in common with user body part 508).

In some embodiments, control circuitry 304 may determine a level of confidence that the print corresponds to the user profile. Control circuitry 304 may determine the level of confidence by determining a number or ratio of characteristics of user body part 508 that match a user profile entry. For example, if seventy percent of the characteristics reflected on a user profile are determined by control circuitry 304 to be part of body part 508, control circuitry 304 may determine the level of confidence to be seventy percent.

In some embodiments, control circuitry 304 may determine whether to provide full access to an application to a user based on the level of confidence. For example, control circuitry 304 may query media guidance data source 418 to determine a first threshold that corresponds to a minimum level of confidence for providing full access to the application. The first threshold may be manually set by a user (e.g., in response to a prompt generated for display by control circuitry 304 on display 312) or by a manufacturer, or may be automatically set by control circuitry 304. Control circuitry 304 may automatically set the first threshold based on any number of factors, such as the value of the application, the amount of personal information utilized by the application, the sensitivity of personal information utilized by the application, and the like.

In some embodiments, control circuitry 304 may compare the level of confidence to the first threshold. Control circuitry 304 may grant the user full access to the application if the level of confidence equals or exceeds the first threshold. If control circuitry 304 grants the user full access to an application, control circuitry 304 may enable the user to utilize portions of an application that require user profile information. As an example, if the application includes a web browser, control circuitry 304 may enable access to some user profile information (e.g., stored passwords or login information, cookies, preferences, bank records, and the like) to a user who has full access to the application. As another example, if the application includes a game, control circuitry may enable access to a user's characters or save points if control circuitry grants a user full access to an application.

In some embodiments, when control circuitry 304 determines not to provide the user full access to the application based on the comparison between the level of confidence and the first threshold, control circuitry 304 may determine to provide the user partial access to the application based on a comparison between the level of confidence and a second threshold. The second threshold represents a level of confidence that must be met or exceeded in order for control circuitry 304 to determine to enable partial access to the application. The second threshold may be set in any manner that the first threshold may be set, as described above.

In some embodiments, when control circuitry 304 enables partial access to an application, control circuitry 304 may restrict all access to user profile information. In other embodiments, when control circuitry 304 enables partial access to an application, control circuitry 304 may restrict access to some but not all user profile information, such that a user has less access to facets of an application when granted partial access than the user would have when granted full access. As an example, if the application includes a web browser, control circuitry 304 may enable a user who is granted partial access to the application to browse the web, but not to load user profile information such as login information, passwords, preferences, bookmarks, and the like. As another example, if the application includes a game, control circuitry 304 may enable a user who is granted partial access to the application to play the game, but not utilize a user's character or load a user's save points.

In some embodiments, control circuitry 304 may grant partial access or full access based on whether a print is of a particular portion of a finger. For example, if control circuitry 304 determines that just the tip of a finger of body part 508 is pressed against print reader 502, control circuitry 304 may provide partial access to the application rather than full access, whereas if control circuitry 304 determines that a full print of a finger of body part 508 is pressed against print reader 502, control circuitry 304 may provide full access to the application. Control circuitry 304 may determine that just the tip of a finger of body part 508 is pressed against print reader 502, rather than a full print, by a comparison of surface area of the print to an expected size of a full print, as discussed above and below. Alternatively, control circuitry 304 may initialize separate user profile entries corresponding to different portions of a finger by prompting a user (e.g., via display 312) to press different portions of a finger against print reader 502 (e.g., tip of finger, left side of finger, right side of finger, full finger). Control circuitry 304 may thereafter determine which portion of the finger is pressed against print reader 502 by consulting each initialized entry when comparing characteristics of a detected print against user profile entries in order to find a match. Control circuitry may associate different functions or levels of confidence with different portions of a body part 508.

In some embodiments control circuitry 304 may detect a gesture performed by body part 508. For example, body part 508 may swipe in a downward direction when releasing from print scanner 502. Control circuitry 304 may responsively invoke a function based on the gesture. For example, media guidance data source 418 may store associations of different gestures, such as swiping in certain directions, double tapping on print scanner 502, and the like, with different functions. In some embodiments, control circuitry 304 may determine based on the stored associations that a downward swipe of a finger on print scanner 502 is associated with the opening of a media guide, and may open the media guide when the downward swipe is detected. Examples of functions that may be invoked include all functions described above and below as potential functions that may be invoked, such as channel tuning, the opening of an application, volume control, and the like.

In some embodiments, control circuitry 304 may detect the presence of a print (e.g., at print reader 502), and may determine whether to invoke a particular function based on whether the print detected is a partial or full print. As an example, control circuitry 304 may invoke one function if just the tip of a fingerprint is detected at print reader 502, but may invoke a different function of a full fingerprint is detected at print reader 502.

Figure 6:
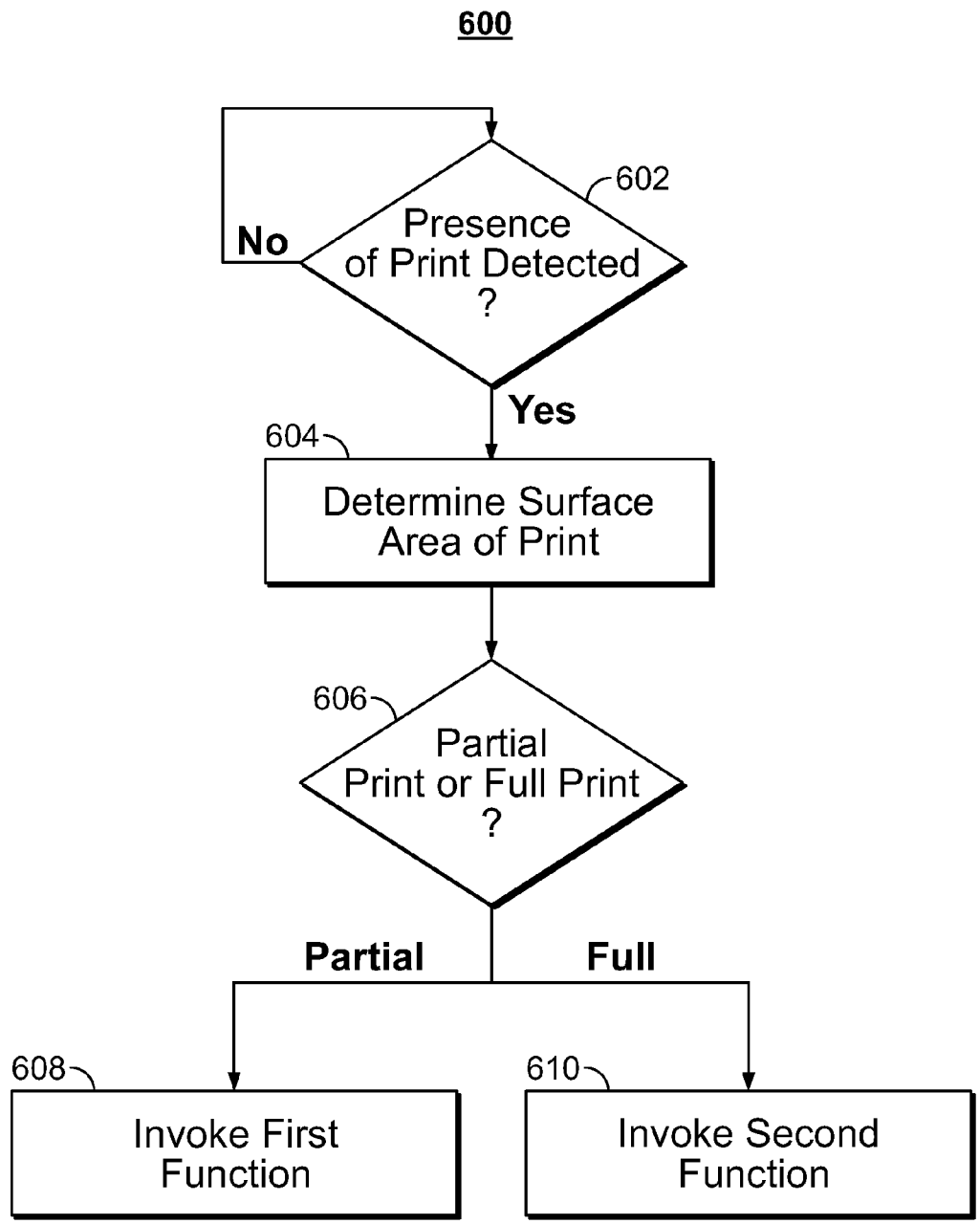
FIG. 6 is a flowchart of illustrative steps involved in determining whether to invoke a first or second function based on whether a partial or full print is detected, in accordance with some embodiments of the disclosure.

FIG. 6 is a flowchart of illustrative steps involved in determining whether to invoke a first or second function based on whether a partial or full print is detected, in accordance with some embodiments of the disclosure. It should be noted that process 600 or any step thereof could be performed on, or provided by, any of the devices shown in FIGS. 3-4. For example, process 600 may be executed by control circuitry 304 (FIG. 3) as instructed by control circuitry implemented on user equipment 402, 404, and/or 406 (FIG. 4) in order to determine an avatar for use in communicating information to a user. In addition, one or more steps of process 600 may be incorporated into or combined with one or more steps of any other process or embodiment (e.g., process 700 (FIG. 7)).

Process 600 begins at 602, where control circuitry 304 may determine if the presence of a print is detected (e.g., at user input interface 310 or print reader 502). If control circuitry 304 does not detect a presence of a print, process 600 may end or start over. Control circuitry 304 may detect a print if body part 508 is determined to be in contact with print reader 502. If control circuitry 304 does detect a presence of a print, process 600 will continue at 604.

At 604, control circuitry 304 may determine a surface area of the print. As discussed above and below, control circuitry 304 may determine the surface area of the print in absolute terms (e.g., a unit area of the print) or in relative terms (e.g., what percentage or portion of print reader 502 the presence of the print is detected on).

At 606, control circuitry 304 may determine whether a partial print or full print is detected. Control circuitry 304 may determine whether a full or partial print is detected by first identifying a user profile associated with the print. Control circuitry 304 may identify the user profile by cross-referencing characteristics of the print against user profile entries stored at media guidance data source 418. The cross-referencing may be done by querying media guidance data source 418 by transmitting a query over communications network 414. Control circuitry 304 may identify a user profile with a most number of characteristics corresponding to characteristics of the print. Control circuitry 304 may then utilize the user profile to determine whether the print is a full print or a partial print. In some embodiments, control circuitry 304 may determine a size of a usual print from the user profile, and may compare the surface area of the detected print to the size of a usual print. Control circuitry 304 may determine that a partial print is detected, as opposed to a full print, if the surface area does not equal, substantially equal, or exceed the size of a usual print.

If control circuitry determines that a partial print has been detected, control process 600 continues to 608, where a first function is invoked. If, on the other hand, control circuitry 304 determines that a full print has been detected, process 600 continues to 610. As discussed above and below, the first function and/or the second function, when invoked, may cause control circuitry 304 to trigger a command related to at least one of volume control, channel tuning, media playback, and media selection at user equipment 500 or a different user equipment device. Additionally, the first and/or second functions may relate to any function including the opening or exiting of an application, accessing a predetermined application, triggering a telephone conversation or the establishment of a chat link (e.g., via Internet Protocol, SMS, and the like). The first and second functions may be related functions. As an example, control circuitry 304 may perform functions (e.g., media guidance functions such as volume or channel control) of different magnitude depending on whether the first or second function is invoked, where, when a partial print is detected, a first function is of a smaller magnitude than a second function associated with a full print would be if a full print were detected. Accordingly, if the first and second functions are volume control commands, control circuitry 304 may increase or decrease the volume at a smaller magnitude if the first function is invoked, rather than the second function, and vice versa.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
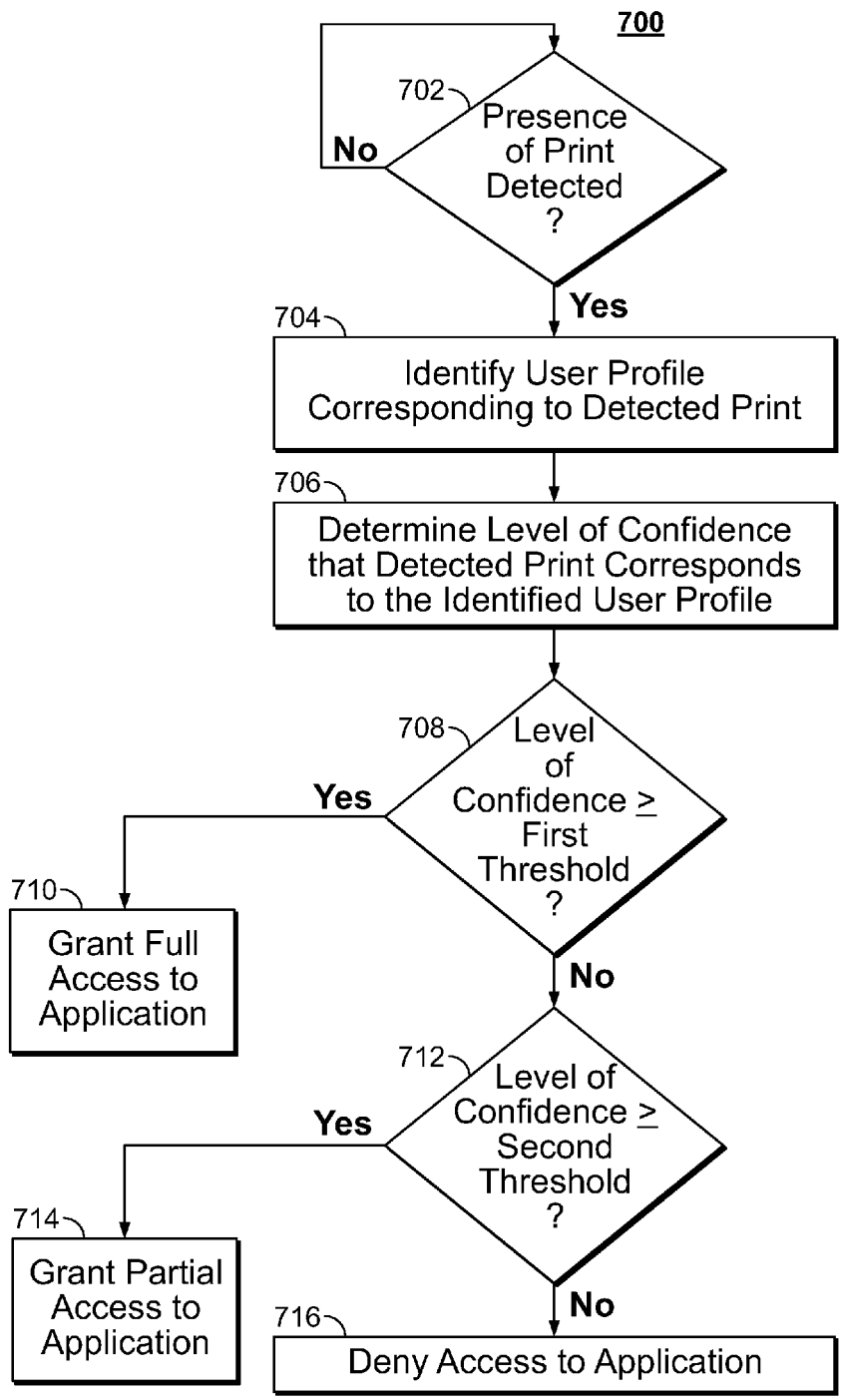
FIG. 7 is a flowchart of illustrative steps involved in determining whether to grant full or partial access to an application, in accordance with some embodiments of the disclosure.

FIG. 7 is a flowchart of illustrative steps involved in determining whether to grant full or partial access to an application, in accordance with some embodiments of the disclosure. It should be noted that process 700 or any step thereof could be performed on, or provided by, any of the devices shown in FIGS. 3-4. For example, process 700 may be executed by control circuitry 304 (FIG. 3) as instructed by control circuitry implemented on user equipment 402, 404, and/or 406 (FIG. 4) in order to determine whether to use a user-selected or automatically selected avatar to communicate information. In addition, one or more steps of process 700 may be incorporated into or combined with one or more steps of any other process or embodiment (e.g., process 600 (FIG. 6)).

Process 700 begins at 702, where control circuitry 304 may determine if the presence of a print is detected (e.g., at user input interface 310 or print reader 502). If control circuitry 304 does not detect a presence of a print, process 600 may end or start over. Control circuitry 304 may detect a print if body part 508 is determined to be in contact with print reader 502. If control circuitry 304 does detect a presence of a print, process 700 will continue at 704.

At 704, control circuitry 304 may identify a user profile corresponding to the print. As discussed above and below, control circuitry 304 may identify the user profile by cross-referencing characteristics of the print against user profile entries stored at media guidance data source 418. The cross-referencing may be done by querying media guidance data source 418 by transmitting a query over communications network 414. Control circuitry 304 may identify a user profile with a most number of characteristics corresponding to characteristics of the print.

At 706, control circuitry 304 may utilize the user profile to determine a level of confidence that the detected print corresponds to the identified user profile. As discussed above and below, control circuitry 304 may determine the level of confidence by determining a number or ratio of characteristics of user body part 508 that match a user profile entry. For example, if seventy percent of the characteristics reflected on a user profile are determined by control circuitry 304 to be part of body part 508, control circuitry 304 may determine the level of confidence to be seventy percent.

At 708, control circuitry 304 may determine whether the level of confidence is greater than or equal to a first threshold. To determine the first threshold, control circuitry 304 may query media guidance data source 418 a minimum level of confidence for providing full access to the application (i.e., the first threshold). The first threshold may be manually set by a user (e.g., in response to a prompt generated for display by control circuitry 304 on display 312) or by a manufacturer, or may be automatically set by control circuitry 304. Control circuitry 304 may automatically set the first threshold based on any number of factors, such as the value of the application, the amount of personal information utilized by the application, the sensitivity of personal information utilized by the application, and the like.

If control circuitry 304 determines that the level of confidence does equal or exceed the first threshold, process 700 continues to 710, where control circuitry 304 may grant the user full access to the application if the level of confidence equals or exceeds the first threshold. If control circuitry 304 grants the user full access to an application, control circuitry 304 may enable the user to utilize portions of an application that require user profile information. As an example, if the application includes a web browser, control circuitry 304 may enable access to some user profile information (e.g., stored passwords or login information, cookies, preferences, bank records, and the like) to a user who has full access to the application. As another example, if the application includes a game, control circuitry may enable access to a user's characters or save points if control circuitry grants a user full access to an application.

If control circuitry 304 determines that the level of confidence does not equal or exceed the first threshold, control process 700 continues to 712, where control circuitry 304 may determine whether to provide the user partial access to the application based on a comparison between the level of confidence and a second threshold. The second threshold represents a level of confidence that must be met or exceeded in order for control circuitry 304 to determine to enable partial access to the application. The second threshold may be set in any manner that the first threshold may be set, as described above.

If control circuitry 304 determines that the level of confidence is greater or equal to the second threshold, process 700 continues to 714, where control circuitry 304 may grant partial access to the application. If partial access is granted, in some embodiments, control circuitry 304 may restrict all access to user profile information. In other embodiments, when control circuitry 304 enables partial access to an application, control circuitry 304 may restrict access to some but not all user profile information, such that a user has less access to facets of an application when granted partial access than the user would have when granted full access. As an example, if the application includes a web browser, control circuitry 304 may enable a user who is granted partial access to the application to browse the web, but not to load user profile information such as login information, passwords, preferences, bookmarks, and the like. As another example, if the application includes a game, control circuitry 304 may enable a user who is granted partial access to the application to play the game, but not utilize a user's character or load a user's save points.

If control circuitry 304 determines that the level of confidence does not equal or exceed the second threshold, process 700 continues to 716. At 716, control circuitry 304 may deny all access to the application. For example, control circuitry 304 may populate a display of user equipment 500 with a message indicating that access is denied.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, determination of whether partial or full access to an application is to be granted may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the user profile information as described herein may be stored in, and retrieved from, storage 308 of FIG. 3, or media guidance data source 418 of FIG. 4. Furthermore, processing circuitry, or a computer program, may update settings associated with a user, such as a user-selected first or second threshold, updating the information stored within storage 308 of FIG. 3 or media guidance data source 418 of FIG. 4.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   detecting a presence of a print associated with a user body part;
   identifying a user profile corresponding to the detected print;
   determining a level of confidence that the print corresponds to the user profile;
   determining whether to provide the user full access to an application by comparing the level of confidence to a first threshold, wherein, if the level of confidence exceeds the first threshold, the user is granted full access to the application;
   in response to determining not to provide the user full access to the application based on the comparing, determining whether to provide the user partial access to the application by comparing the level of confidence to a second threshold, wherein, if the level of confidence exceeds the second threshold, the user is granted partial access to the application; and
   in response to determining to provide the user partial access to the application, enabling the user to access a subset of features offered by the application.

2. The method of claim 1, wherein providing the user full access to the application comprises enabling the user to access features of the application that utilize information from the profile, and wherein providing the user partial access to the application comprises enabling the user to access features of the application that do not utilize information from the profile.

3. The method of claim 1, wherein determining the level of confidence comprises:
   determining characteristics of the print;
   comparing the characteristics of the print to characteristics of the profile; and
   determining the level of confidence based on the comparing.

4. The method of claim 3, wherein the comparing comprises calculating a percentage match between characteristics of the print and characteristics of the profile.

5. The method of claim 1, wherein the print corresponds to a finger, and wherein determining the level of confidence comprises determining whether the print is of a particular portion of the finger.

6. The method of claim 5, further comprising:
   detecting a gesture performed by the finger; and
   invoking a function based on the gesture.

7. The method of claim 1, wherein the first threshold is set based on characteristics of the user profile, and wherein the second threshold is set based on characteristics of the user profile.

8. The method of claim 1, wherein enabling partial access to the application comprises restricting access to a feature available when full access to the application is enabled.

9. The method of claim 1, wherein the user profile has an entry corresponding to the print that is initialized by identifying characteristics of the user body part.

10. The method of claim 9, wherein determining the level of confidence comprises comparing the characteristics of the user body part that were identified during initialization to characteristics of the detected print.

11. A system comprising:
   print detection circuitry; and
   control circuitry configured to:
      detect, using the print detection circuitry, a presence of a print associated with a user body part;
      identify a user profile corresponding to the detected print;
      determine a level of confidence that the print corresponds to the user profile;
      determine whether to provide the user full access to an application by comparing the level of confidence to a first threshold, wherein, if the level of confidence exceeds the first threshold, the user is granted full access to the application;
      in response to determining not to provide the user full access to the application based on the comparing, determine whether to provide the user partial access to the application by comparing the level of confidence to a second threshold, wherein, if the level of confidence exceeds the second threshold, the user is granted partial access to the application; and
      in response to determining to provide the user partial access to the application, enable the user to access a subset of features offered by the application.

12. The system of claim 11, wherein the control circuitry is further configured to
   when providing the user full access to the application, enable the user to access features of the application that utilize information from the profile, and
   when providing the user partial access to the application, enable the user to access features of the application that do not utilize information from the profile.

13. The system of claim 11, wherein the control circuitry is further configured, when determining the level of confidence, to:
   determine characteristics of the print;
   compare the characteristics of the print to characteristics of the profile; and
   determine the level of confidence based on the comparing.

14. The system of claim 13, wherein the control circuitry is further configured, when performing the comparing, to calculate a percentage match between characteristics of the print and characteristics of the profile.

15. The system of claim 11, wherein the print corresponds to a finger, and wherein the control circuitry is further configured, when determining the level of confidence, to determine whether the print is of a particular portion of the finger.

16. The system of claim 15, wherein the control circuitry is further configured to:
   detect a gesture performed by the finger; and
   invoke a function based on the gesture.

17. The system of claim 11, wherein the first threshold is set based on characteristics of the user profile, and wherein the second threshold is set based on characteristics of the user profile.

18. The system of claim 11, wherein the control circuitry is further configured, when enabling partial access to the application, to restrict access to a feature available when full access to the application is enabled.

19. The system of claim 11, wherein the user profile has an entry corresponding to the print that is initialized by identifying characteristics of the user body part.

20. The system of claim 19, wherein, when determining the level of confidence, the control circuitry is further configured to compare the characteristics of the user body part that were identified during initialization to characteristics of the detected print.

* * * * *